US006693647B1

United States Patent
Bernard et al.

(10) Patent No.: US 6,693,647 B1
(45) Date of Patent: Feb. 17, 2004

(54) METHOD AND APPARATUS FOR DISPLAYING NOTIFICATION THAT A COLOR CORRECTED IMAGE IS BEING VIEWED

(75) Inventors: Peter Bernard, San Francisco, CA (US); William J. Hilliard, San Francisco, CA (US)

(73) Assignee: LightSurf Technologies, Inc., Santa Cruz, CA (US)

( * ) Notice: Subject to any disclaimer, the term of this patent is extended or adjusted under 35 U.S.C. 154(b) by 0 days.

(21) Appl. No.: 09/422,215

(22) Filed: Oct. 19, 1999

Related U.S. Application Data

(60) Provisional application No. 60/104,839, filed on Oct. 19, 1998.

(51) Int. Cl.$^7$ ................................................ G09G 5/00
(52) U.S. Cl. ...................... 345/700; 345/733; 345/760; 345/772; 345/846
(58) Field of Search ................................. 345/700–702, 345/716, 727, 728, 733, 760, 764, 772, 810, 835, 156, 173, 589, 593, 594, 597, 690

(56) References Cited

U.S. PATENT DOCUMENTS

| | | | | |
|---|---|---|---|---|
| 5,247,358 A | * | 9/1993 | Richards | 348/189 |
| 5,298,993 A | * | 3/1994 | Edgar et al. | 348/180 |
| 5,381,349 A | * | 1/1995 | Winter et al. | 348/179 |
| 5,483,259 A | * | 1/1996 | Sachs | 345/594 |
| 5,638,117 A | * | 6/1997 | Engeldrum et al. | 345/904 |
| 6,008,836 A | * | 12/1999 | Bruck et al. | 345/719 |
| 6,337,922 B2 | * | 1/2002 | Kumada | 345/604 |

FOREIGN PATENT DOCUMENTS

| | | |
|---|---|---|
| EP | 0849936 A | 6/1998 |
| EP | 0 878 303 A2 | 1/1999 |

(List continued on next page.)

OTHER PUBLICATIONS

Patent Abstracts of Japan, vol. 1998, No. 13, Nov. 30, 1998.
"Reducing WWW Latency and Bandwidth Requirements by Real–Time Distallation," Computer Networks and ISDN Systems, vol. 28, No. 11, May 1, 1996, pp. 1445–1456.

(List continued on next page.)

Primary Examiner—Sy D. Luu
(74) Attorney, Agent, or Firm—John A. Smart

(57) ABSTRACT

A system and method for providing critical end user feedback as to the color correction status of imagery shown on a client display, thus notifying the user that the color image being viewed is color accurate. In particular, the invention includes server and or client based applets which automatically informs viewers and/or other receivers of digital images as to the state of color correction for a particular digital image, thus notifying a viewer of the visual integrity of the digital image being displayed. The notification may be an icon that provides users with a visible indication about the integrity of color imagery currently being viewed by the client at a specific web site. It does this by briefly flashing the cursor for a fraction of a second to indicate if whether or not the page is being viewed utilizing calibrated color. This icon can be implemented in addition, or instead, in the OS, in a web-enabled application, or in a browser (when implemented on as a client-side application); or it can be implemented as an image, tag, program, or watermark embedded within a web page by the web server or by any of the links between server and client within the network infrastructure.

38 Claims, 4 Drawing Sheets

FOREIGN PATENT DOCUMENTS

| | | | |
|---|---|---|---|
| EP | 0 907 283 A1 | | 7/1999 |
| EP | 0 907 283 | | 7/1999 |
| EP | 0 889 636 A2 | | 11/1999 |
| EP | 1103918 A2 | | 5/2001 |
| JP | WO98/37690 | | 8/1998 |
| JP | 10-224643 | * | 8/1999 |
| WO | WO 98/15091 | | 9/1998 |
| WO | WO0029935 A1 | | 5/2000 |
| WO | WO 01/75802 | * | 4/2001 |

OTHER PUBLICATIONS

"Encrypted Username/Password Support," Netscape Internet Site—Consumer Articles, Aug. 12, 1998, 1 page.

""Padlock" Security Indicator Does Not Work Correctly With Frames," Netscape Internet Site—Consumer Articles, Aug. 12, 1998, 1 page.

Patent Abstracts of Japan—Publication No. 10117290.

* cited by examiner

FIG. 5A
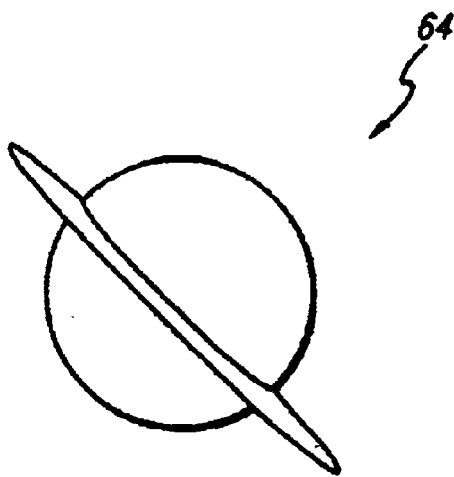
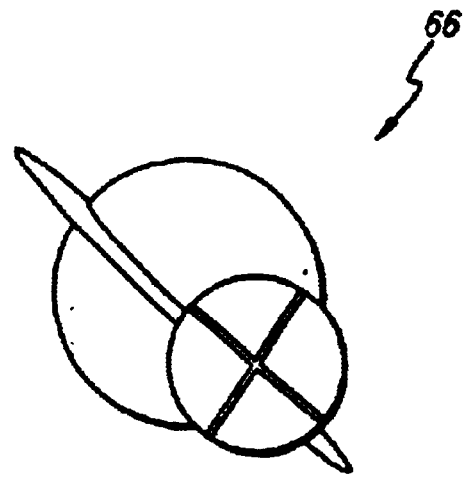
FIG. 5B

METHOD AND APPARATUS FOR DISPLAYING NOTIFICATION THAT A COLOR CORRECTED IMAGE IS BEING VIEWED

RELATED APPLICATION

This application claims priority of provisional application Ser. No. 60/104,839 filed Oct. 19, 1998.

BACKGROUND OF THE INVENTION

1. Field of the Invention

This invention relates generally to color imaging technology and more particularly to notification devices for indicating when a color correction image is being viewed. The same technique has applications for all sensory technology implemented on computers where there is commercial value in notifying end-users about whether that data has been personalized or corrected for their perception.

2. Description of the Prior Art

Conventional methods for color corrected digital images require the characterization of a video system used to create a digital image (source) and the characterization of a video or printing system that is displaying the color corrected image (client). This is typically done by matching the display properties of the source and client, either by mathematical transforms of respective color spaces or by forcing the source and client into a matching color state. A calorimetric system is essentially a system by which a color can be quantified. A calorimetric system can thus be used to characterize the color output of one color imaging system relative to other color imaging systems. The process of "characterizing" a color imaging system generally refers to the calculation of a color response, or input-output function for that particular color imaging system using the coordinates of the colorimetric system. A calorimetric system also facilitates transformation of color values to produce a color output in one color imaging system that matches the color output of a different color imaging system. The result of matching the display properties of the source and client is that the client is able to view the image with similar color characteristics as seen by the source author.

The tremendous popularity of the Internet has brought color imaging technology away from technicians in a single facility; and into the hands of low-involvement, mass market, consumers who are physically removed from the Web authoring process. This changes the requirements for imaging systems where previously there was no communication between content author or viewer, and no need for it. This method and apparatus address the new problem for both consumers and web merchants caused when consumers are unable to know anything about the color correction status of an image. For example, web-based shopping catalogs compete with printed catalogs for the same sales dollars. However, for web catalogs to compete effectively with their printed counterparts, they must provide consumers with the same level of benefits now enjoyed with catalogs in print. One is these benefits is color-corrected imagery consumes can trust. Thus, as color corrected images displayed over the Internet become more widely available to the general public, a method is needed to inform clients that their display system either is, or is not, currently displaying color-corrected images.

In an attempt to identify color corrected images, conventional images are color tagged with information, often in an International Color Consortium ("ICC") color profile format, before posting on a compact disc, web site, or other repository for later viewing, as is well known in the industry and defined by the ICC Profile Format Specification, Version 3.4—Aug. 15, 1977, the contents of which are hereby incorporated by reference (latest version available at the website of the International Color Consortium). These images may even have some special watermark or logo indicating that they are authored in a manner enabling color accurate display, such as "authored with ColorSync®," or some similar logo.

Moreover, conventionally, Internet browsers, servers, and/or other image viewing software, such as Internet Explorer (version 4.01 and later) and Silicon Graphics ("SGI") Cosmo Color, can look for an ICC format color profile on the client or target display for use in color correcting the image seen. These browsers or viewers might have some logo or mark or technical description indicating that they offer "color accurate browser technology," indicating that they are enabled to display color-corrected images, under certain conditions.

Conventional approaches are generally deficient, however, in that end-users cannot rely on the above noted marks to know if in fact they are presently viewing an image in a color accurate state. For example, it may be such that the image was enabled for color correction but the browser and server technology do not enable the client to properly display the image. Conversely, the browser and/or server may be enabled to color correction for the client, but the image currently being viewed is not authored with use of ICC format profiles, or in some other way as to enable display with color accuracy. Thus, only when both the image authoring and image viewing technologies enable color correction is the image seen with color accuracy. Since conventional approaches fail to sufficiently inform an end-user client that a color correction process has actually occurred on a particular image, the end-user does not know whether a color accurate image is currently being viewed.

What is needed therefore is an apparatus and method for providing to an end user client feedback as to the color correction status of imagery shown on the client display. Although the current application of this apparatus and method relates to color-corrected imagery, a similar apparatus and method would be used related to any type of resolution or image correction, to correction of sound or auditory characteristics, to correction of feel characteristics as with the use of a joystick or other input device, or to any other human input (taste, smell), or any other correction of analog or sensory data.

SUMMARY OF THE INVENTION

The present invention provides, in a first aspect, a method for providing feedback to either a remote (i.e., physically at a different location, or connected via a client/server architecture or method), or a local (i.e., within a single location or computer) user as to color correction status of an image displayed on a system, including the steps of determining the presence of color correction information in the image, determining the state of calibration of the user's system, and notifying the user of color correction status in accordance with the steps of determining the presence of color correction information in the image and determining the state of calibration of the user's system.

In another aspect, the present invention provides a client based icon applet for use in indicating to an end user a state of color correction of digital images being viewed, including an icon having a first state indicating that images being viewed are color corrected as viewed and a second state indicating that images being viewed are not color corrected as viewed, and logic for determining if the image being viewed includes a color notification tag and a display device associated with the use is calibrated for corrected color display for inserting a selected state of the icon to be inserted in the digital image to be viewed.

These and other features and advantages of this invention will become further apparent from the detailed description and accompanying figures that follow. In the figures and description, numerals indicate the various features of the invention, like numerals referring to like features throughout both the drawing figures and the written description.

BRIEF DESCRIPTION OF THE DRAWINGS

FIG. 5(a) is a picture of a typical icon for notifying the user that the image has been color corrected on a client display in accordance with the present invention.

FIG. 5(b) is a picture of a typical icon for notifying the user that the image has not been color corrected on a client display in accordance with the present invention.

DETAILED DESCRIPTION OF THE PREFERRED EMBODIMENT(S)

The present invention provides a system and method for providing end user (client) feedback as to the color correction status of imagery on a client display, thus notifying the user that the color image being viewed is color accurate. This information is critical since the end user is often in a remote location, separated in time and distance from the author of the image, and unable to know the characteristics of the imaged being viewed. In particular, the present invention automatically informs viewers and/or other receivers of digital images as to the state of color correction for the digital images, thus notifying a viewer of the visual integrity of the digital image being displayed. Consequently, viewers feel assured and secure about images they see as to the color accuracy of those images.

In particular, the present invention is implemented as a software process that is loaded into either an Internet browser or server technology. A browser is a client application that enables a user to view HTML (or equivalent) documents on the web, another network, or the user's computer. The software may be implemented in the form of a small program, such as Java or ActiveX application programs, that is loaded into a web browser, such as Microsoft's Internet Explorer or Netscape's Navigator. The software may also be implemented on server technology, such as Cosmo Color from Silicon Graphics. One skilled in the art will recognize that other conventional or newly developed software processes may be used as well and the invention may be implemented using hardware or a combination of hardware and software. One skilled in the art will recognize that the invention can apply to other browser technology, such as local CD browsers and other non-Internet browsers.

Figure 1:
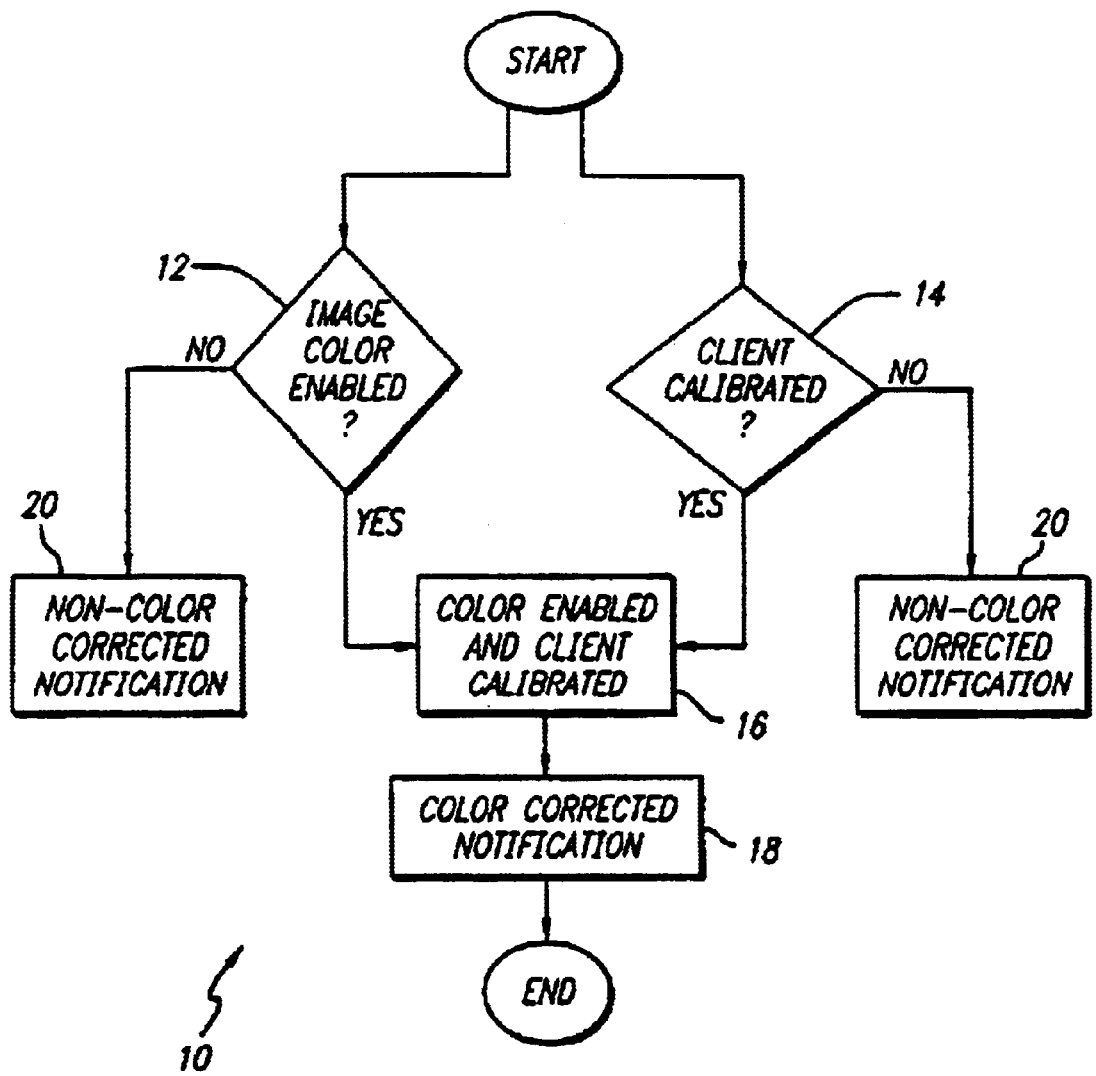
FIG. 1 is a flow chart illustrating the method for providing end user (client) feedback as to the color correction status of imagery shown on the client display in accordance with the preferred embodiment of the invention.

Referring to FIG. 1, a flowchart 10 of an algorithm for implementing the present invention is illustrated. The present invention is typically enabled when browser begins to reassemble the web page onscreen, following the hidden HTML codes in the main document to determine where to place text, graphics or videos onscreen. In particular, the present algorithm is implemented when browser begins to assemble the image part of the web page to be displayed. One skilled in the art, however, will recognize that implementation of the present invention can be initiated at anytime an image is present. The present invention initially determines whether the image has been color enabled (step 12) and whether the image has been color corrected (step 14). The present invention then determines the whether the system is acting in accordance with steps 12 and 14 above to provide color accuracy (step 16). Upon determining whether the image is color enabled (step 12) and corrected (step 14), notification is provided about the integrity of color imagery currently being viewed by the client at a specific web site. In particular, when the image is color enabled and corrected, notification is provided to the client that the color of the image is accurate (step 18). If the image is not either color enabled or corrected, notification is provided to the client that the color of the image may not be accurate (step 20). The invention then returns to a standby mode until another web page with images is detected.

As noted above, in step 12, the present invention determines whether the displayed image has been color enabled by detecting whether there is color correction information (i.e. color specific files for the device characteristics of the reference image as represented on the reference device) associated with the displayed image. For example, to detect whether an image is color enabled, the present invention detects whether the following color correction information (i.e. color specific files or registry entries) is associated with the image: (1) user specific Hypertext Markup Language (HTML) tags within the web page that designate the color properties of the source image, (2) standard ICC profiles which are embedded within the image file itself and (3) pointers to user specific (i.e. HTML) or standard (i.e. ICC profiles) color files associated with the image file. One skilled in the art will recognize that the present invention is not limited to detecting specific color correction information, nor is it limited just to fully composed web pages as opposed to individual images or portions of images.

In operation, to determine whether an image is color enabled via HTML color corrected information, the preferred embodiment of the present invention detects whether user selected predetermined HTML tags are present in the web page. HTML, a markup language used for documents on the web, uses standard tags to mark elements, such as text and graphics, in a document to indicate how web browsers should display these elements to the user and should respond to user actions. The present embodiment detects whether the web page includes predetermined HTML tags. For example, in the preferred embodiment, when a web page with an image is color enabled, the HTML tags direct a browser to display a predetermined text as a headline of a certain size, such as the title "True Internet Color":

<html> Marks the beginning and end of an HTML-coded file

</head> Contains descriptive information, like the title and author, not displayed onscreen. It also holds formatting information, such as style sheets.

<title> Shop-o-rama True Internet Color(r)</title> Sets the web page's title, displayed in the blue bar atop the screen </head> Contains descriptive information, like the title and author, not displayed onscreen. It also holds formatting information, such as style sheets.

<html> Marks the beginning and end of an HTML-coded file

Figure 2:
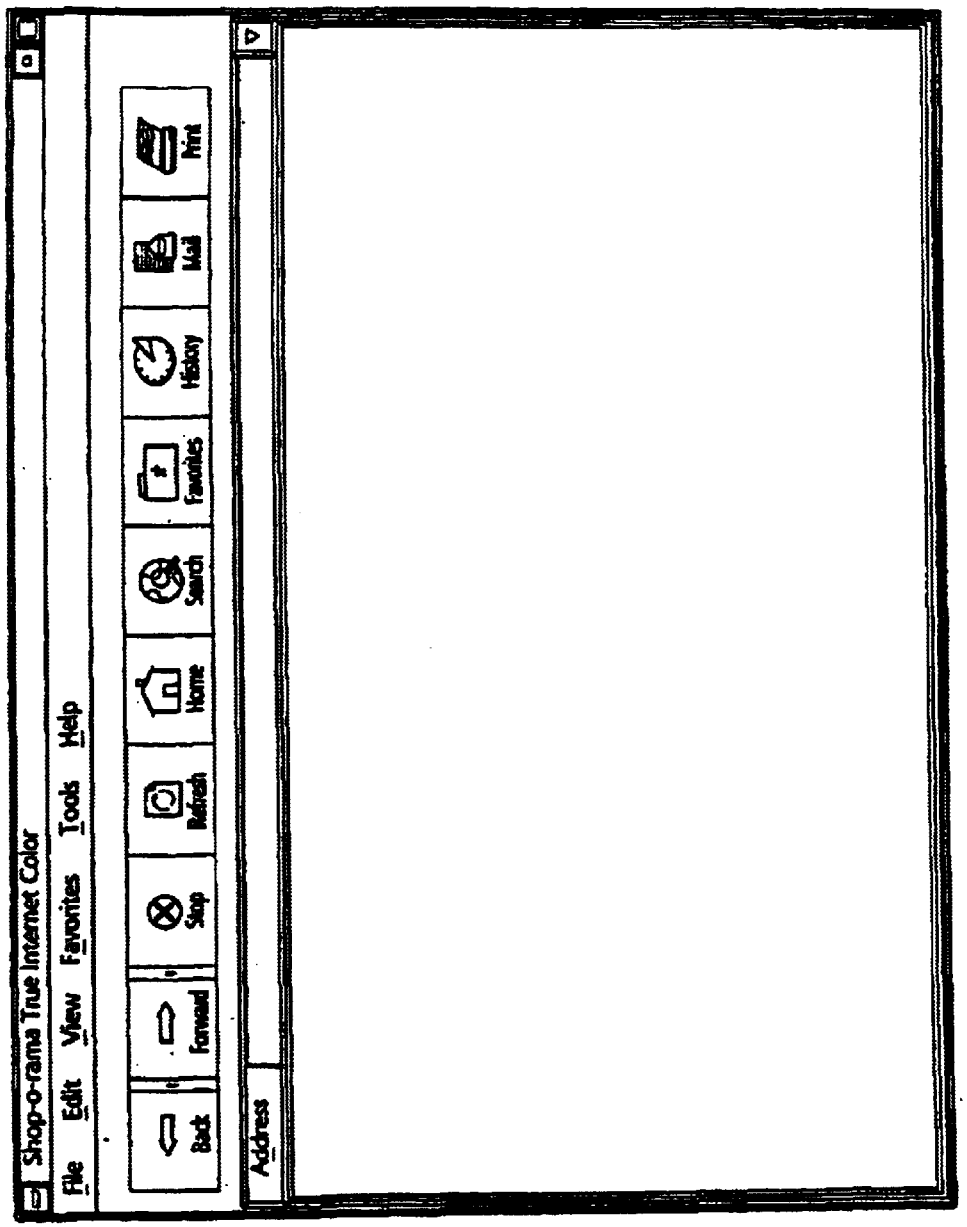
FIG. 2 is a depiction of a screen view of a web page that is enabled to be color-corrected using an HTML tag in accordance with the method shown in FIG. 1.

FIG. 2 is a depiction of a screen view of a web page 22 having a title "True Internet Color" thus enabling the present invention to recognize that the page is color enabled. Thus when a web page includes the title "True Internet Color" the image is considered to be color enabled. One skilled in the art will recognize that the present invention is not limited to recognition of HTML tags directed at the title "True Internet Color," but rather may be any predetermined HTML tag, or web image tag, configuration.

To determine whether an image is color enabled via ICC color correction information, the present invention detects whether ICC profiles (for the device characteristics of the reference image as represented on the reference device) are embedded within the image file based upon an ICC profile format specification. In particular, the present invention detects data stored in ICC profiles, which are described in the ICC profile specification. ICC profiles are device profiles that can be used in pairs to translate color data created on one device into a native color space of another device. More specifically, an ICC profile is provided for each device and is used by the present invention to transform color image data from a device-dependent color space to the profile connection space, and to transform color image data from the profile connection space to another device-dependent color space. These ICC profiles for the device characteristics of the reference image as represented on the reference device may be embedded in the image file or stored in a memory in a connected personal computer. For example, the ICC profiles could be stored in a memory, accessible by a CPU, and associated with the image instead of embedded. Additionally, it should be noted that ICC profile can be assessed by the client from a variety of other sources such as network interface or from other external devices via a modem interface.

To determine whether an image is color enabled—even without an embedded or associated color profile—the present invention detects whether the image is in a known color space, such as SRGB. SRGB is a well-defined color space, includes various versions such as SRGB 64, and is further defined at the sRGB website. One skilled in the art will recognize that implementation of the present invention may be used with any kinds of images, including those subject to compression techniques, such as GIF, PNG or JPEG formatted images.

Referring to step 14, the present invention interrogates the client system to determine if that system is characterized and calibrated to the same state, or to a different but known state. In other words, the present invention detects the presence of a transfer function in the client system, i.e. in the hardware or software (or the combination of hardware/software and human perception). In particular, the present invention checks file entries and registries, or pointers to such entries and registries, to determine whether characterization parameters are present. A flag, initialized to a set value, signals whether the client system has been characterized. For example, in a typical embodiment, a binary flag initialized to a zero value is set to a non-zero value when the present invention detects the client system is characterized. In accordance with the present invention, a client may use any type of conventional or newly developed color calibration system including, for example, the interactive color calibration method disclosed in U.S. Pat. No. 5,638,117.

Referring to step 16, the present invention then determines the whether the system is acting in accordance with steps 12 and 14 above to provide color accuracy. In particular, once the present invention confirms that the presence of color correction information in the displayed image (step 12) and the image has been adjusted, as needed, to display properly on the calibrated or characterized client system (step 14) (i.e. color accuracy is being provided for in step 16), a notification is displayed to the user (step 18). When the software process determines that color accurate display is occurring on all or part of the image, then an appropriate notification is made to inform the user that color correction has occurred where marked. One skilled in the art will recognize that the particular type of notification is not critical to the invention. The notification may be visual or non-visual notification (e.g. audio). For example, the visual notification may be an icon that provides users with a visible indication about the integrity of color imagery currently being viewed by the client at a specific web site. It does this by briefly flashing the cursor for a fraction of a second to indicate if whether or not the page is being viewed utilizing color correction. This icon can be implemented in addition, or instead, in the OS, in a web-enabled application, or in a browser (when implemented on as a client-side application); or it can be implemented as an image, tag, program, or watermark embedded within a web page by the web server or by any of the links between server and client within the network infrastructure.

For example, when a user requests a Web page from a web site enabled by the present invention, the HTML is sent to the client directly from the web site's main servers. A specially attached URL link calls up color-corrected images from the hosted server, and the client's browsers integrate the two pieces automatically. Thus, in accordance with the present invention, the notification not only provides notification feedback to the user, but also reinforces a message of data fidelity to the end-user in determining whether the color data is accurate or not. The present invention has applicability for any client viewing or display application where color accuracy is important to the communication of information. Examples include, but are not limited to, viewing artwork, fashion, cosmetic, logo or brand colors, paint, photography and other color-sensitive information over a medium such as the Internet where content viewer and content creator are disconnected by physical space and/or time. Although, for illustrative purposes, the present invention is described and illustrated utilizing web pages hosted on a server and displayed with color correction on a client, the invention is not limited to such a configuration. Rather, the present invention would apply equally well to images displayed on any imaging peripheral including transmissive, reflective, and other source and/or client imaging technologies. Moreover, the present invention would also apply to images not viewed by the Internet, such as images within computer applications, TV, broadcast, or other client output media of any kind, including printed output. The present method would apply to both digital images and analog images including both real and synthetic images authored for, and/or viewed on, a client system.

Figure 3:
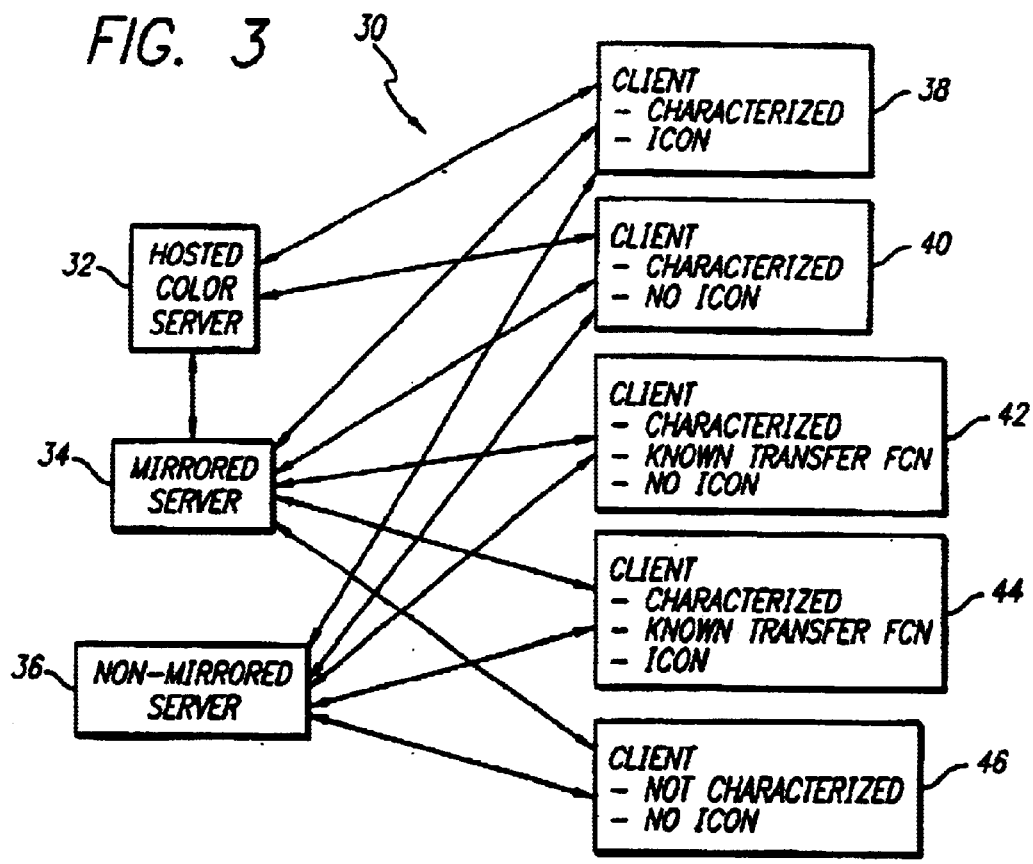
FIG. 3 is a functional block diagram of a client-based notification system for providing critical end user feedback as to the color correction status of imagery on a client display.
Figure 4:
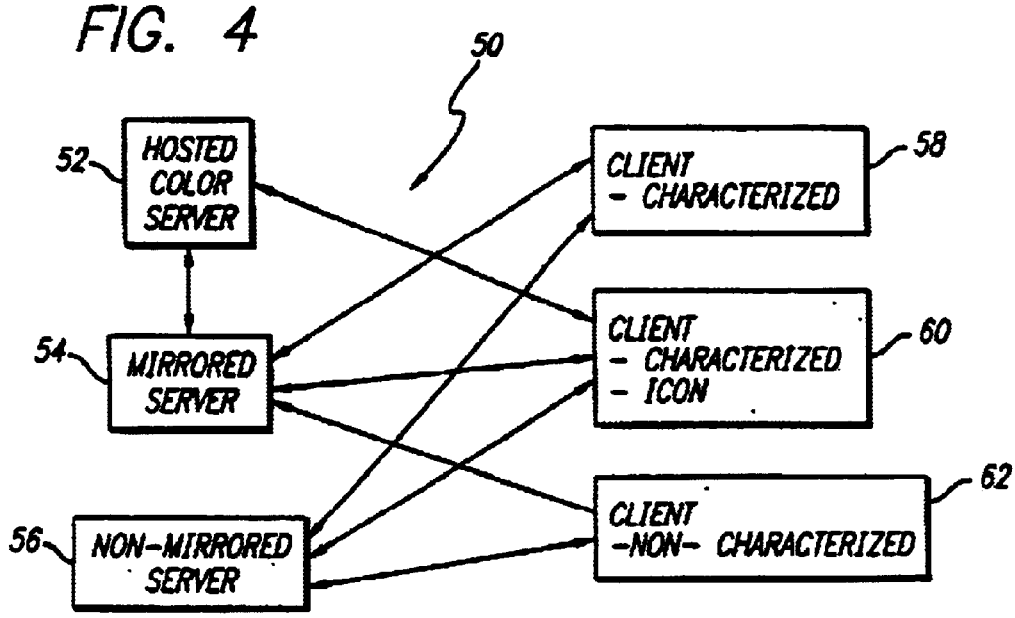
FIG. 4 is a functional block diagram of a server-based notification system for providing critical end user feedback as to the color correction status of imagery on a client display.

The present invention may be implemented as a client-based notification system 30 as shown in FIG. 3 or server-based notification system 50 as shown in FIG. 4. With respect to a client-based notification system, the present invention may be installed on a client system such as client 38, peripheral, and/or other output technology that has various states of visual display to notify the user about the state of color correction for digital images output or displayed. Referring to FIG. 3, a functional block diagram of a client-based notification system 30 for providing critical end user feedback as to the color correction status of imagery on a client display is illustrated. Client-based notification system 30 is shown with hosted color server 32, mirrored server 34, non-mirrored server 36 and clients 38, 40, 42, 44 and 46 which represent the various types of clients, that is, clients such as 38 and 40 which include the client based notification techniques of the present invention (indicated by the term "icon"), clients 38, 40, 42 and 44 which are characterized for color, clients 42 and 44 which have a known transfer function and client 46 which is not characterized, has no known color transfer function and does not include a-notification system according to the present invention.

Icon 66 depicted in FIG. 5(b), provided by client 38 is preferably initiated to a non-corrected state. When client 38 sends a request to mirrored server 34, which mirrors hosted color server 32, a color corrected requested image is sent from hosted color server 32 to client 38 including a color notification tag, such as a specific HTML title bar flag. The Web page HTML from server 34 includes a color notification tag within its HTML tags to indicate in the title bar that the images to be sent by server 32 have been enabled for color correction. For example, as shown in FIG. 2, the title bar of the web page may include a notification in its title bar, such as "True Internet Color", in addition to other terms such as the name of a related company, to indicate color correction. As noted above, one skilled in the art will recognize that the present invention is not limited to the detection of predetermined HTML title tags, rather, any device capable of detection may be used as the color notification tag. Upon arrival at the client 38, the present invention detects the color notification tag by evaluating the HTML tags sent from server 34 to determine whether the image delivered from server 32 has been color correction enabled by detecting the True Internet Color tag in the title. It also checks whether client 38 has been color characterized or calibrated to a known state. If both conditions are true, an icon such as icon 66 depicted in FIG. 5(b) is changed to a corrected state as depicted by icon 64 in FIG. 5(a). In contrast, when client 38 sends a request to a site providing non color corrected pages, such as non-mirrored server 36, which is does not include the special HTML tags, such as "True Internet Color" to indicate color correction, then icon 66 remains unchanged from its non-corrected default state.

Still referring to FIG. 3, local client 40 is characterized but includes no applet incorporating the present invention for notification as indicated by the phrase "no-icon". Local client 40 is in direct communication with mirrored server 34 and hosted color server 32. Local client 40 provides no notification icon. When local client 40 sends a request to mirrored server 34, the requested image is color corrected and sent back by hosted color server 32, with no notification icon on client 40. When local client 40 communicates with non-mirrored server 36, the requested image is not color corrected, and there is no notification icon to this effect.

Client 42 is characterized and includes a known (characterized or calibrated) transfer function but no applet incorporating the present invention for notification. Client 42 is in direct communication with mirrored server 34 and non-mirrored server 36 and in direct communication with hosted color server 32 via redirection requests from mirrored server 34. Client 42 provides no notification icon. When client 42 sends a request to mirrored server 34, the requested image is corrected. However, no notification indicating color correction is sent back to client 42. When client 42 sends a request to non-mirrored server 36, the requested image is not color corrected and no notification of color correction is,sent back to client 42. In such case, the title bar of the web page would not indicate a color corrected image.

Client 44 is characterized and includes a known (characterized or calibrated) transfer function and includes an applet incorporating the present invention for notification. Client 44 is in direct communication with mirrored server 34 and non-mirrored server 36 and in direct communication with hosted color server 32 via redirection requests from mirrored server 34. Client 44 provides a notification icon. When client 44 sends a request to mirrored server 34, the requested image sent by hosted color server 32 is color corrected. In such case, the title bar of the web page would indicate a color corrected image. Notification indicating color correction is sent back to client 44 indicating a color corrected image being displayed. When client 44 sends a request to non-mirrored server 36, the requested image is not corrected and no notification of color correction is sent back to client 44. In such case, the title bar of the web page would not indicate a color corrected image.

Client 46 is neither characterized nor includes an application incorporating the present invention for notification. Client interacts with non-mirrored server 36 only and provides no notification icon. When client 46 sends a request to non-mirrored server 36, which is not in mirror communication with hosted color server 32, the requested image sent by non-mirrored server 36 is not color corrected and no notification is provided to the client 46. In such case, the title bar of the web page would not indicate a color corrected image.

Referring now to FIG. 4, a functional block diagram of a server-based notification system 50 for providing critical end user feedback as to the color correction status of imagery on a client display is illustrated. With respect to a server-based notification system, the present invention may be installed on a web site server to notify the user about the state of color correction for digital images output or displayed. In particular, the icon of the present invention can be implemented in an image, tag, program, or watermark embedded within a web page by the web server or any of the links between server and client within the network infrastructure. Server-based notification system 50 is shown with hosted color server 52, mirrored server 54, non-mirrored server 56 and clients 58, 60, 62 and 64. The icon of the present invention is installed in hosted color server 52 and mirrored server 54 and not in non-mirrored server 56.

When client 58 sends a request to hosted 52, client 58 may communicate through some means that it is a client that is of a specific, known calibration. This notification may be included in the HTML stream sent by the browser, or via any other method. In that case, if a color corrected image is sent from hosted color server 52 (or from mirrored server 54) to client 58, then an icon is also sent by mirrored server 54 or by hosted color server 52 to indicate that the image has been corrected. In contrast, when client 58 sends a request to non-mirrored server 56, which is not in communication with hosted color server 52, non-mirrored server 56 does not include an icon (or sends an icon indicating that no color correction has occurred).

In accordance with an alternative embodiment of the invention, client 60 is characterized and includes an applet incorporating the present invention for providing notification. Local client 60 is in direct communication with mirrored server 54 or hosted color server 52, which also includes the notification icon. When client 60 sends a request to mirrored server 54 or hosted color server 52 as described above, the requested image is color corrected and sent back by web site server along with a notification icon indicating a corrected state. Mirrored server 54 also sends the HTML tags indicating color correction and the icon on client is changed to indicate the corrected state. Logic is implemented to arbitrate between the state of the two icons (server-based and client-based). For example, in one embodiment either the server or client based notification icon may take precedence while in another embodiment a third icon, similar to the icons shown in FIGS. 5(*a*) and (*b*), may be used to indicate the presence of a different level of color correction based on the presence of both server and client based notifications.

Client 62 is neither characterized nor includes an application incorporating the present invention for notification. When client 62 sends a request to server 54, then either server 52 would use HTML tags to add some watermark or other image to the web page to indicate color accuracy; or server 52 would request web server 54 to send an image which already has an icon superimposed on the image sent by server 54. When client 62 sends a request to non-mirrored server 56, the requested image sent by non-mirrored server 56 is not color corrected and no notification is provided to client 62. In such case, the title bar of the web page would not indicate a color corrected image, and no icon would be sent by non-mirrored server 56.

In accordance with an alternative embodiment of the present invention, depending upon the relationship between the mirrored server 54 and hosted color server 52, hosted color server 52 may require mirrored server 54 to identify images not color corrected. In such case, a server based icon can be sent to a client to indicate images which are not color corrected.

In accordance with another alternative embodiment of the present invention, multilevel icon certifications may be provided. In particular, multilevel icon certifications can be utilized to distinguish between icon certifications between various entities providing for color correction. For example, when hosted color server 52 provides color correction, an icon identifying not only color correction, but correction specifically provided by a particular hosted color server, is sent to the client. On the other hand, if color correction is provided by another entity, an icon identifying color correction, without identification of a specific entity providing for correction, is sent to the client.

Having now described the invention in accordance with the requirements of the patent statutes, those skilled in the art will understand how to make changes and modifications in the present invention to meet their specific requirements or conditions. Such changes and modifications may be made without departing from the scope and spirit of the invention as set forth in the following changes.

What is claimed is:

1. A method for notifying a user as to color correction status of an image on a local display, comprising:
   determining presence of color correction information in an image displayed on a user's system;
   determining a state of calibration of said user's system; and
   notifying said user of a color correction status of said image in accordance with said determining the presence of color correction information in said image and determining a state of calibration of said user's system.

2. The method claimed in claim 1, wherein said method is implemented in a software process loaded into an Internet browser.

3. The method claimed in claim 1, wherein said method is implemented in a software process loaded into a content browsing application.

4. The method claimed in claim 1, wherein said method is implemented in a software process loaded into server technology that is viewed by a remote client.

5. The method claimed in claim 1, wherein said method is implemented in a software process loaded into server technology that is viewed by a local client.

6. The method claimed in claim 1, wherein said method is implemented both as a software process loaded into a content browsing application and server technology approximately simultaneously, together with an arbitration mechanism to determine the proper notification of status.

7. The method claimed in claim 1, wherein said color correction information comprises HTML color information.

8. The method claimed in claim 1, wherein said information on the state of calibration of said users' system comprises HTML color information.

9. The method claimed in claim 1, wherein said determining presence of color correction information in said image further comprises:
   detecting whether HTML tags that designate color properties are present in a web page associated with said image.

10. The method claimed in claim 1, wherein said determining presence of color correction information in said image further comprises:
    detecting whether HTML tags that designate color properties are sent via one server, referencing said image sent by a different server.

11. The method claimed in claim 1, wherein the information about the state of calibration of said user's system is determined by said server by detecting HTML tags sent by said server.

12. The method claimed in claim 1, wherein said color correction information comprises ICC profile color correction information.

13. The method claimed in claim 1, wherein the state of calibration of said user's system comprises ICC-format profile information.

14. The method claimed in claim 1, wherein said determining presence of color correction information in said image further comprises:
    detecting whether ICC profiles are embedded within the image, or associated with the file, based upon ICC profile format specifications.

15. The method claimed in claim 1, wherein said determining presence of color correction information in said image further comprises:
    detecting GIF-formatted images based upon GIF profile format specifications.

16. The method claimed in claim 1, wherein said determining presence of color correction information in said image comprises:
    detecting PNG-formatted images based upon PNG profile format specifications.

17. The method claimed in claim 1, wherein said determining presence of color correction information in said image further comprises:
    detecting JPEG-formatted images based upon JPG profile format specifications.

18. The method claimed in claim 1, wherein said determining presence of color correction information in said image further comprises:

detecting images in a known color space.

19. The method claimed in claim 1, wherein said determining presence of color correction information in said image further comprises:
   detecting images in a predefined color space.

20. The method claimed in claim 1, wherein said notifying said user of color correction status in accordance with said determining the presence of color correction information in said image and determining state of calibration of said user's system further comprises:
   providing a visual notification regarding the status of color correction status of said image.

21. The method claimed in claim 20, wherein said visual notification is an icon.

22. The method claimed in claim 1, wherein said notifying said user of color correction status in accordance with said determining the presence of color correction information in said image and determining state of calibration of said user's system further comprises:
   providing auditory notification regarding the status of color correction status of said image.

23. The method claimed in claim 1, wherein said notifying said user of color correction status in accordance with said determining the presence of color correction information in said image and determining state of calibration of said user's system further comprises:
   providing audio-visual sensory notification regarding color correction status of said image.

24. A computer-readable medium containing instructions executable by one or more client processors to indicate to an end user a state of color correction of digital images being viewed, said instructions comprising:
   an icon having a first state indicating that images being viewed are color corrected as viewed and a second state indicating that images being viewed are not color corrected as viewed;
   logic for determining if the image being viewed includes a color notification tag and a display device associated with the use is calibrated for corrected color display; and
   logic for inserting a selected state of the icon into the digital image being viewed based on said determining if the image being viewed includes a color notification tag and a display device associated with the use is calibrated for corrected color display.

25. The computer-readable medium of claim 24, wherein said icon is initiated to the second state indicating that images being viewed are not color corrected as being viewed as a default state.

26. The computer-readable medium of claim 24, wherein said logic for determining if the image being viewed includes a color notification tag and a display device associated with the use is calibrated for corrected color display further comprises:
   logic for evaluating HTML tags sent by a server to determine whether said image has been color corrected.

27. The computer-readable medium of claim 26, wherein said logic for evaluating HTML tags sent by a server to determine whether said image has been color corrected further comprises:
   logic for evaluating predetermined HTML title tags sent by a server to determine whether said image has been color corrected.

28. The computer-readable medium of claim 24, wherein said logic for determining if the image being viewed includes a color notification tag and a display device associated with the use is calibrated for corrected color display further comprises:
   logic for detecting the presence of a transfer function in a client system.

29. The computer-readable medium of claim 24, wherein said logic for determining if the image being viewed includes a color notification tag and a display device associated with the use is calibrated for corrected color display further comprises:
   logic for detecting the presence of characterization parameters.

30. The computer-readable medium of claim 24, further comprising:
   a flag having a first state indicating that the display devices associated with the use is calibrated for corrected color display and second state indicating that the display devices associated with the use is not calibrated for corrected color display; and
   logic for determining if the display device associated with the use is calibrated for corrected color display for determining a selected state of the flag.

31. The computer-readable medium of claim 24, wherein said logic for inserting a selected state of the icon in the digital image being viewed based on said determining if the image being viewed includes a color notification tag and a display device associated with the use is calibrated for corrected color display further comprises:
   logic for inserting the icon having the first state indicating that images being viewed are color corrected and the display device associated with the use is calibrated for corrected color display.

32. The computer-readable medium of claim 24, wherein said logic for inserting a selected state of the icon in the digital image being viewed based on said determining if the image being viewed includes a color notification tag and a display device associated with the use is calibrated for corrected color display further comprises:
   logic for inserting the icon having the second state indicating that images being viewed are not color corrected or the display device associated with the use is not calibrated for corrected color display.

33. The computer-readable medium of claim 25, wherein said logic for inserting a selected state of the icon in the digital image being viewed based on said determining if the image being viewed includes a color notification tag and a display device associated with the use is calibrated for corrected color display further comprises:
   logic for leaving the icon in the default second state indicating that the images being viewed are not color corrected or the display device is not calibrated for corrected color display.

34. The computer-readable medium of claim 24, wherein said icon also identifies color correction by a particular server.

35. A computer-readable medium containing instructions executable by one or more server processors to indicate to an end user a state of color correction of digital images being viewed, said instructions comprising:
   an icon having a first state indicating that images being viewed are color corrected as viewed and a second state indicating that images being viewed are not color corrected as viewed;
   logic for determining if a client has a specific, known calibration and the images to be viewed are color corrected; and
   logic for inserting a selected state of the icon in the digital image to be viewed based on said determining if a client has a specific, known calibration and the images to be viewed are color corrected.

36. The computer-readable medium of claim 35, wherein said logic for determining if a client has a specific, known calibration and the images to be viewed are color corrected further comprises:

logic for determining the presence of an HTML stream sent by a browser associated with said client.

37. The computer-readable medium of claim 36, wherein said logic for determining the presence of an HTML browser associated with said client further comprises:

logic for inserting the icon having the first state indicating that images being viewed are color corrected when a HTML stream is detected.

38. The computer-readable medium of claim 36, wherein said logic for determining the presence of a HTML stream sent by a browser associated with said client further comprises:

logic for inserting the icon having the second state indicating that images being viewed are not color corrected when a HTML stream is not detected.

* * * * *